United States Patent [19]

Gorman, Sr.

[11] Patent Number: 5,542,442
[45] Date of Patent: Aug. 6, 1996

[54] USED OIL FILTER CLEANING SYSTEM

[75] Inventor: Gary W. Gorman, Sr., 4800 Nebo Dr., La Mesa, Calif. 91941

[73] Assignee: Gary W. Gorman, Sr., San Diego, Calif.

[21] Appl. No.: 58,135

[22] Filed: Aug. 12, 1993

[51] Int. Cl.$^6$ .............................. B08B 3/00; B08B 7/00; B08B 9/00
[52] U.S. Cl. .................... 134/104.4; 134/111; 134/152; 134/22.18; 134/10; 134/40; 134/22.1; 134/22.12
[58] Field of Search ............................ 134/22.1, 22.12, 134/22.18, 10, 40, 152, 104.4, 111

[56] References Cited

U.S. PATENT DOCUMENTS 3,566,892   3/1971   Logue et al. ........................ 134/103
4,967,776   11/1990  Folmar ................................ 134/57 R Primary Examiner—Richard O. Dean
Assistant Examiner—Zeinab El-Arini

[57] ABSTRACT

An oil filter cleaning system having a used oil and water receiving tank and a water supply tank. A used oil filter is secured to the top end of a pipe connected to a submersible water pump in the water supply tank and when operated will drive water under pressure up through the aperture in the bottom of the water filter and drive the used oil remaining therein out an aperture that has been formed in the side of the oil filter adjacent its bottom end. This flow of water and used oil that exits the oil filter is then directed into a filtration system located adjacent the top end of the used oil water receiving tank. The water filtration system has a large debris catching screen acting as a first phase and a fine mesh nylon filter acting as a second phase of filtration. The used oil passing through the fine mesh nylon filter floats on top of the water in the used oil and water receiving tank. The water at the bottom of the used oil and water receiving tank is free to pass to the water supply tank. This system allows for collection of the used oil by skimming off the top of the water surface in the used oil and water receiving tank.

7 Claims, 1 Drawing Sheet

USED OIL FILTER CLEANING SYSTEM

BACKGROUND OF THE INVENTION

The invention relates generally to a cleaning apparatus and more specifically, to an improved system for removing residual oil from the interior of a used oil filter by the use of pressurized water that reverse flushes the used oil filter.

Used oil filters, having normal characteristics of not being biodegradable, are not desirable for landfill. In the state of California it has become a law that all used oil filters are regulated as hazardous waste. At this time there is only one way to treat used oil filters. The used oil filters are transported to one location in California and then melted down for the recyclable metal. This is a waste of the used oil they contain that could be recycled, and a waste of the paper element inside the used oil filter.

The above described process for getting rid of oil filters is also relatively expensive. At this time it costs between $60.00 and $100.00 for the removal of one 55 gallon barrel full of used oil filters. The used oil filters are stored in 55 gallon barrels that must be sealed. Storage is limited to less than 1 ton. Under 1 ton, they can be stored for one year and when the one ton limit is reached they have to be removed within 180 days or you are required by law to obtain a hazardous waste facility permit.

It is an object of the invention to provide a novel oil filter cleaning system that would eliminate the present waste of used oil filters that is being put in landfills.

It is also an object of the invention to provide a novel oil filter cleaning system that will allow the waste oil in the oil filter to be saved for recycling.

It is another object of the invention to provide a novel oil filter cleaning system that will not create any air pollution, It is a further object of the invention to provide a novel oil filter cleaning system that will drastically lower the cost of recycling used oil filters.

SUMMARY OF THE INVENTION

The principal of the novel oil filter cleaning system is to clean the waste oil from used oil filters by using high pressure water with a biodegradable cleaner added to the water. The process of cleaning a used oil filter is done by recycling water through a filtering system and it is dependent upon water and oil not mixing.

The water will be directed into the used oil filter from the center bottom screw on fitting. This is normally the output side for the filtered oil and the water will flow backwards from the clean to the dirty side of the used oil filter. High pressure water will fill the entire cavity of the used oil filter. The water will then be forced out of the used oil filter through a ½ inch hole that has been punched in the outer casing of the used oil filter. At this point the water and used oil will flow without pressure to the water receiving tank.

At the top of the water receiving tank is a two stage filtering system. The first filtering system is a large debris catching screen. After the flow of water and dirty oil has passed through the large debris catching screen, it will pass through a fine mesh nylon filter. This filter will remove carbon and dirt while slowing the used oil passage and forcing the used oil to float on the top of the water in the water receiving tank.

Water from the bottom of the water receiving tank will pass freely therefrom to the water supply tank by an equalization pipe connecting the two tanks together adjacent their bottom ends. The water passing through this pipe will be substantially oil free and will be pumped from the water supply tank by a submersible pump under a predetermined pressure through a pipe to the bottom of the used oil filter to complete the cycle.

When the used oil needs to be skimmed from the water receiving tank, this will be accomplished by turning the shut-off valve on the equalization pipe. When this is done while operating the submersible pump, the water and oil level in the water receiving tank will rise causing the floating oil to flow down an over flow pipe to a used oil storage can.

When the supply of water and cleaner is to be replenished, the shut-off valve on the equalization pipe will be closed. Next water and cleaner will be added to the water supply tank to raise the level of the water therein until any used oil floating on the top of the water in the water supply tank will rise to the level of the pass-over pipe that connects to the water receiving tank.

DESCRIPTION OF THE PREFERRED EMBODIMENT

Figure 1:
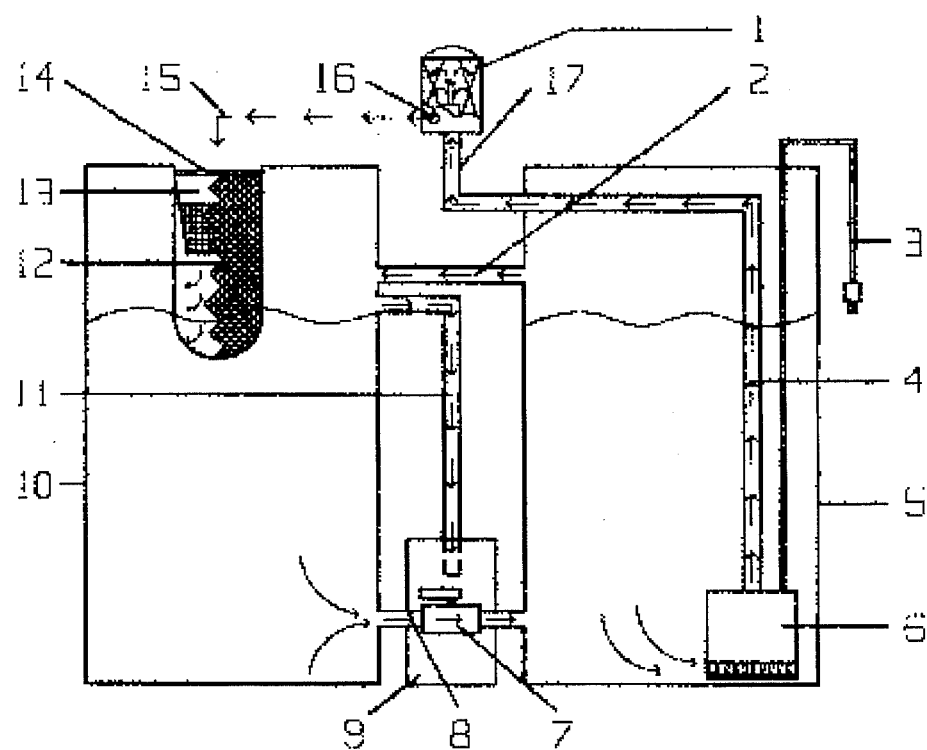
FIG. 1 is a schematic illustration of the novel oil filter cleaning system.

The novel oil filter cleaning system will now be described by referring to FIG. 1 of the drawing. A used oil filter 1 is screwed on the top of an oil filter attachment pipe 17. An aperture 16 is formed in the side of the used oil filter to expel used oil and water. The flow direction 15 of the used oil and water takes it to the entrance point 14 of the filtration system. This filtration system has a large debris catching screen 13 that is in communication with and surrounded by a fine mesh nylon filter 12. As the used oil and water passes through filter 12, beads of oil are formed and a surface layer of oil is created that floats on the top surface of the water in used oil and water receiving tank 10.

An equalization pipe 8 is connected between the used oil and water receiving tank 10 and water supply tank 5. When shut-off valve 7 is open, the water level in the two tanks will equalize themselves due to atmospheric pressure. A submersible water pump 6 is located in the bottom of water supply tank 5 and when it is operated it will supply water through high pressure water pipe 4 to the bottom of oil filter 1.

When a sufficient amount of used oil is floating on the top surface of the water in the used oil and water receiving tank 10, valve 7 is closed. The submersible water pump 6 would still be operating and its continued flow of dirty oil and water into water receiving tank 10 will cause the level of the fluid in that tank to rise until it is in communication with used oil overflow pipe 11 which will cause the used oil floating on the water to travel through the used oil overflow pipe 11 and be deposited in used oil storage tank 9.

Periodically, there might be a thin film of oil that forms on the top surface of the water in water supply tank 5. In order to remove this, shut off valve 7 would be closed and additional water would be added to water supply tank 5 until its level reaches the pass over pipe 2 and this thin layer of oil would then travel through pass over pipe 2 and be deposited on the top surface of the water in the used oil and water receiving tank 10.

What is claimed is:

1. An apparatus for cleaning oil filters containing waste oil comprising;
   - a water supply tank having a top end and a bottom end, said water supply tank having an amount of water therein that has a top water surface;
   - an oil filter attachment pipe having a top end and a bottom end, means on said top end for detachably securing the bottom end of an oil filter;
   - means for supplying pressurized water from said water supply tank to the bottom end of said oil filter attachment pipe;
   - a water and used oil receiving tank having a top end and a bottom end; said water and used oil receiving tank having an amount of water therein that has a top oil surface;
   - means for receiving and filtering the used oil and water that has been flushed out of a used oil filter and depositing it in said water and used oil receiving tank whereby the used oil floats on the top surface of the water therein;
   - a water level equalization pipe having front end and a rear end, said front end being connected to the water in said water supply tank and said rear end being connected to the water in said water and oil receiving tank; and
   - means for skimming the used oil off the top surface of the water in said water and used oil receiving tank.

2. An apparatus for cleaning oil filters containing waste oil as recited in claim 1 wherein said means for supplying pressurized water from said water supply tank to the bottom end of said oil filter attachment pipe comprises a submersible water pump connected to a pressurized water pipe.

3. An apparatus for cleaning oil filters containing waste oil as recited in claim 1 wherein said means for receiving and filtering the used oil and water that has been flushed out of a used oil filter comprising a debris catching screen.

4. An apparatus for cleaning oil filters containing waiste oil as recited in claim 1 wherein said means for receiving and filtering the used oil and water that has been flushed out of a used oil filter comprising a fine mesh filter.

5. An apparatus for cleaning oil filters containing waste oil as recited in claim 1 wherein said water level equalization pipe has a flow shut-off valve.

6. An apparatus for cleaning oil filters containing waste oil as recited in claim 1 wherein said means for skimming the used oil off the top surface of the water in said water and used oil receiving tank is an overflow pipe having an inlet port positioned at a height in said water and used oil receiving tank.

7. An apparatus for cleaning oil filters containing waste oil as recited in claim 1 further comprising an enlongated pass-over pipe positioned at a height and having one end connected to the interior of said water supply and its other end connected to the interior of said water and used oil receiving tank.

* * * * *